(12) United States Patent
Mullins et al.

(10) Patent No.: US 6,883,106 B2
(45) Date of Patent: Apr. 19, 2005

(54) SYSTEM FOR COMMUNICATING A SIGNAL TO A DEVICE INDICATING AN OUTPUT SUPPLY LEVEL BEING PROVIDED TO A BACKPLANE FROM A POWER SUPPLY UNIT

(75) Inventors: Barrie Jeremiah Mullins, Wicklow Town (IE); Michael Lardner, Tuam (IE); Aedan Diarmuid Cailean Coffey, Kilkenny (IE)

(73) Assignee: Richmount Computers Limited, Dublin (IE)

( * ) Notice: Subject to any disclaimer, the term of this patent is extended or adjusted under 35 U.S.C. 154(b) by 580 days.

(21) Appl. No.: 09/900,204

(22) Filed: Jul. 6, 2001

(65) Prior Publication Data
US 2002/0043877 A1 Apr. 18, 2002

(30) Foreign Application Priority Data

Jul. 6, 2000 (IE) .......................................... S2000/0548
Sep. 7, 2000 (IE) .......................................... S2000/0708

(51) Int. Cl.[7] ................................................ G06F 1/28
(52) U.S. Cl. ..................................................... 713/340
(58) Field of Search .......................... 714/14; 713/300; 710/79

(56) References Cited
U.S. PATENT DOCUMENTS

| 5,313,369 | A |   | 5/1994  | Lewis et al.        |
|-----------|---|---|---------|---------------------|
| 5,475,295 | A |   | 12/1995 | Hong                |
| 5,483,423 | A |   | 1/1996  | Lewis et al.        |
| 5,654,592 | A |   | 8/1997  | Butler et al.       |
| 5,721,458 | A |   | 2/1998  | Kearney et al.      |
| 5,790,782 | A |   | 8/1998  | Martinez et al.     |
| 5,814,762 | A |   | 9/1998  | Tusler et al.       |
| 5,842,027 | A | * | 11/1998 | Oprescu et al. ............. 713/300 |
| 5,892,973 | A |   | 4/1999  | Martinez et al.     |
| 5,956,665 | A |   | 9/1999  | Martinez et al.     |
| 6,050,658 | A |   | 4/2000  | O'Sullivan et al.   |
| 6,061,244 | A |   | 5/2000  | O'Sullivan et al.   |
| 6,115,814 | A |   | 9/2000  | Lieber et al.       |
| 6,188,973 | B1|   | 2/2001  | Martinez et al.     |
| 6,498,459 | B1|   | 12/2002 | Okumura et al.      |
| 6,553,500 | B1|   | 4/2003  | Sterzik et al.      |
| 6,658,504 | B1|   | 12/2003 | Lieber et al.       |
| 2002/0004342 | A1 |  | 1/2002 | Mullins et al.     |
| 2002/0008427 | A1 |  | 1/2002 | Mullins et al.     |
| 2002/0010883 | A1 |  | 1/2002 | Coffey et al.      |
| 2002/0044561 | A1 |  | 4/2002 | Coffey             |
| 2002/0044562 | A1 |  | 4/2002 | Killen, Jr. et al. |
| 2002/0046276 | A1 |  | 4/2002 | Coffey et al.      |
| 2002/0054477 | A1 |  | 5/2002 | Coffey et al.      |
| 2002/0129182 | A1 |  | 9/2002 | Coffey             |
| 2002/0129232 | A1 |  | 9/2002 | Coffey             |
| 2002/0159311 | A1 |  | 10/2002| Coffey et al.      |
| 2003/0051194 | A1 |  | 3/2003 | Cabezes et al.     |
| 2003/0056048 | A1 |  | 3/2003 | Mullins et al.     |

FOREIGN PATENT DOCUMENTS

JP            411110083 A      4/1999

OTHER PUBLICATIONS

IBM, Long Term Peak and Average Power Consumption Logging for Power Supply Size Determination, Research Disclosure, Aug. 1, 1999, Page(s) 3, vol. 42, No. 424.

* cited by examiner

Primary Examiner—Thomas Lee
Assistant Examiner—Mark Connolly
(74) Attorney, Agent, or Firm—Oppedahl & Larson LLP

(57) ABSTRACT

A power supply unit controller for a rack enclosure in which a plurality of devices communicate via a backplane is disclosed. The controller reads at least one signal indicative of an output supply level being provided to the backplane by a power supply unit associated with the power supply unit controller and stores at least one value associated with a respective one of the at least one signal. The controller communicates the at least one value to one of the devices; and receives power for the power supply unit controller from the backplane.

3 Claims, 2 Drawing Sheets

SYSTEM FOR COMMUNICATING A SIGNAL TO A DEVICE INDICATING AN OUTPUT SUPPLY LEVEL BEING PROVIDED TO A BACKPLANE FROM A POWER SUPPLY UNIT

RELATED APPLICATIONS

This application relates to co-pending application no. S2000/0708 filed on Sep. 7, 2000 entitled "A Protocol for a Power Suppy Unit Controller" naming Barrie Jeremiah Mullins et al as inventors; and co-pending application no. S2000/0706 filed on Sep. 7, 2000 entitled "Data Gathering Device for a Rack Enclosure" naming Aedan Diarmid Cailean Coffey et al as inventors.

FIELD OF THE INVENTION

The present invention relates to an improved power supply unit (PSU) controller.

BACKGROUND OF THE INVENTION

In a rack enclosure comprising a backplane across which a plurality of devices, for example, storage disks communicate across a bus, for example, a SCSI bus, one or more power supply units are frequently used to supply power in the form of one or more voltage supply rails to the backplane for use by the devices. With the increasing complexity of configuration of rack enclosures, their continued operation can become more critical and so it becomes important not alone to diagnose faults when they have occurred but also to determine when faults may occur and what their cause might be.

The present invention seeks to mitigate the problems of detecting and diagnosing problems which may occur in a rack enclosure power supply unit.

DISCLOSURE OF THE INVENTION

According to the present invention there is provided a power supply unit controller for a rack enclosure in which a plurality of devices communicate via a backplane, said controller comprising:

- means for reading at least one signal indicative of an output supply level being provided to said backplane by a power supply unit associated with said power supply unit controller;
- memory for storing at least one value associated with a respective one of the at least one signal;
- means for communicating said at least one value to one of said devices; and
- means for receiving power for said power supply unit controller from said backplane.

According to a second aspect of the invention there is provided a rack enclosure including a backplane, at least one power supply unit connected to and adapted to supply power to said backplane, each associated with a respective power supply unit controller according to the invention, and a plurality of devices receiving power from said backplane, at least one of said devices adapted to communicate with the at least one power supply unit controller.

BRIEF DESCRIPTION OF THE DRAWINGS

An embodiment of the invention will now be described with reference to the accompanying drawings, in which.

Table 1 shows the information stored within the PSU controller;

Table 2 provides a brief overview of the functionality of the input/output pins used by the PSU controller;

Table 7 illustrates the commands supported by the PSU controller; and

Table 8 illustrates the format of the data bytes associated with a status command.

DESCRIPTION OF THE PREFERRED EMBODIMENT

Figure 1:
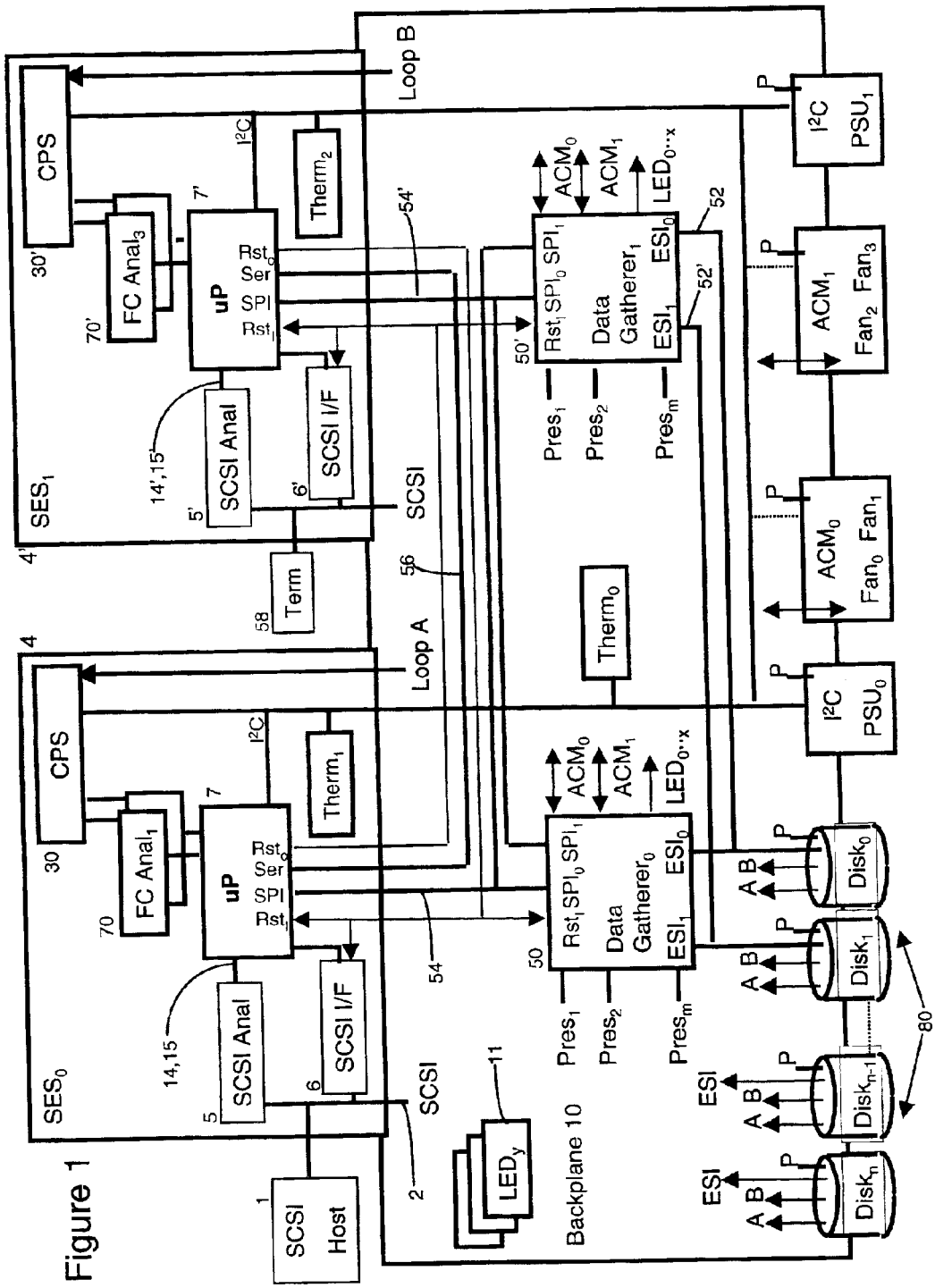
FIG. 1 is a block diagram illustrating a backplane incorporating a pair of power supply units according to a preferred embodiment of the present invention.
Figure 2:
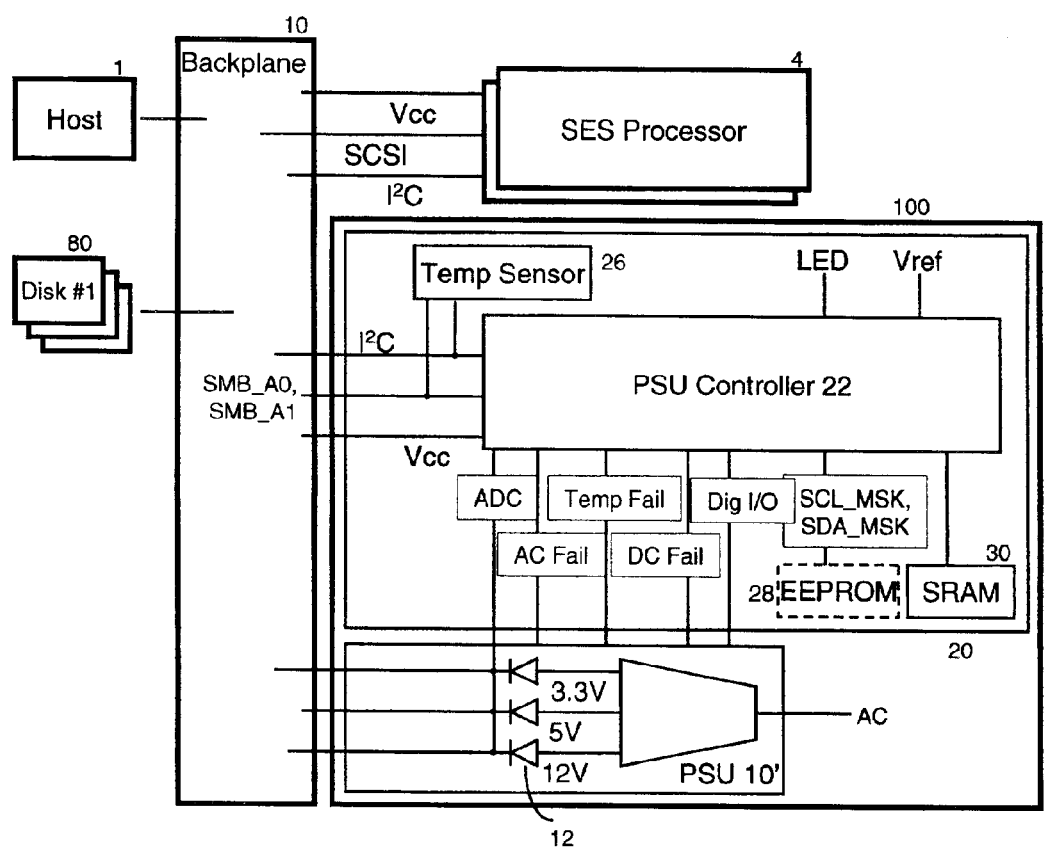
FIG. 2 is a more detailed schematic view of the power supply unit and controller according to a preferred embodiment of the invention.

An improved Power Supply Unit (PSU) 100 according to a preferred embodiment of the invention is shown in FIG. 2. The PSU 100 incorporates a conventional type PSU 10' of the type adapted to fit inside a rack enclosure (not shown) and to transform an AC mains supply or a 48V DC supply (not shown) voltage to one or more DC supply rail levels—in the present example 3.3V, 5V and 12V. Typical examples of such PSU's are manufactured by Artesyn and Celestica. Within the rack, the PSU 100 connects to a backplane 10 and supplies the DC levels through respective unidirectional devices 12, such as diodes, to corresponding tracks (not shown) running across the backplane 10—the diodes enable more than one PSU to provide power t the same supply rail on the backplane. Other tracks on the backplane form one or more busses which interconnect other devices connected to the backplane. A more detailed description of a rack enclosure housing such power supply units is provided in relation to FIG. 1 in co-pending U.S. application Ser. No. 09/900,214 filed Jul. 6, 2001 entitled "Data Gathering Device for a Rack Enclosure" naming Aeden Diarmid Cailean Coffey et al as inventors published May 9, 2002 as U.S. 2002/0054477 A1.

The preferred embodiment is described in terms of a PSU for a rack enclosure housing a plurality of SCSI bus compatible devices, for example, a plurality of disk drives 80 comprising a RAID array system. These are in turn controlled from a host application 1 running on another device connected to the SCSI bus. The invention is nonetheless not limited to SCSI devices with other examples including Fibre Channel based devices.

According to the present invention, the PSU 100 incorporates a controller board 20. The board 20 includes a microcontroller 22 which in the preferred embodiment, is chosen from the NEC KOS family (uPD78F9177YGB-8ES). The PSU controller 22 gathers environment information from the PSU 10' and reports it, using, for example, a serial bus, to an Environment Monitoring System, which in the preferred embodiment is a processor 4 supporting the SCSI Environmental Services (SES) protocol. The SES processor 4 in turn communicates with a host application 1, for example, Vision supplied by Eurologic Systems Limited enabling user control and monitoring of environmental information. As described in the related application entitled "Data Gathering Device for a Rack Enclosure", it is possible, for redundancy reasons, to have more than one SES Processor 4, 4', however, for simplicity the present description will make reference to only one processor.

In the preferred embodiment, the PSU controller 22, rather than drawing its power supply Vcc from the closest available source, i.e. the PSU 10, instead draws its power from an appropriate one of the 3.3V, 5V or 12V supply rails on the backplane 10. This could be seen as adding a potential point of failure to the system, however, it means that should the PSU incorporating the PSU controller either completely fail or should its Vcc supply rail being used by the PSU controller fail, it is still possible for the PSU controller to draw power from any remaining operational PSU's located in the enclosure and supplying power to the backplane 10.

So, while the addition of a microcontroller per se to the power supply could on the one hand be seen as an additional potential point of failure, the PSU controller of the preferred embodiment can remain operational and provide useful information to an operator long after its corresponding PSU has failed.

As will be seen from the following description describing the operation of the controller, because failure or even potential failure is reported in software, failure messages indicate to an operator the reason for failure without requiring the operator to carry out any investigation of the hardware.

Thus, where a conventional PSU without a controller either partially or completely fails and indicates failure through the switching on or off of a LED or buzzer, the operator may not detect such a failure until, for example, catastrophic power failure when all rack PSUs fail. If on the other hand, the operator does notice the failure of a single PSU, the operator may then need to carry out exhaustive investigation to determine the fault, which may be as simple as an AC supply failure.

Using the PSU of the preferred embodiment, precise reasons for partial and/or complete failure of a PSU can be reported immediately and continuously to an operator even at a remote location, so preventing catastrophic failure of a system and improving maintainability of the system.

Turning now to the functionality of the PSU, the PSU controller 22 supports:

a set of analog to digital converters, ADC, which are used by an internal ADC for monitoring respective voltage and current levels of the 3.3V, 5V and 12V power rails in the PSU;

the serial bus, I²C, which is used to communicate to the SES Processor 4;

further digital inputs for general purpose I/O (GPIO); and one LED output.

The complete I/O functionality for the controller of the preferred embodiment is fully described in Table 2.

Using pins SMB_A0, SMB_A1 connected to the backplane 10, the PSU controller 22 supports four serial bus addresses, from 20 hex to 23 hex inclusive. These pins cause the address to be different based on the position of the power supply in the system, e.g. left=20 hex and right=21 hex. Thus, any rack enclosure can incorporate up to 4 PSUs individually addressable from one or more SES processors.

A plurality of temperature sensors 26 (one corresponding to each PSU and located on the PSU controller board) are also connected to the 2 wire serial bus, but are not under control of the PSU controller 22. The temperature sensors addresses are of the form 010011XXb where XX are the same as the 2 least significant bits in the PSU serial address, thus the temperature sensors have addresses from 4C hex to 4F hex inclusive.

i.e. PSU=20 hex Temperature Sensor=4C hex and PSU= 22 hex Temperature Sensor=4E hex.

Turning now to the analog inputs, the voltage and current values reported are each an 8 bit (1 byte) value read from the internal ADC, where 00 hex is 0V and FF hex is the maximum voltage that can be measured on that voltage rail. (Where there is a requirement to do some calculations on this data it is carried out in the SES Processor microcontroller using a scaling factor/resolution, explained below, associated with the analog signal being measured.)

The ADC voltage range is between Gnd and Vcc of the microcontroller. For the PSU controller the analog voltages are referred to in the present description as AGnd and AVcc.

$$Gnd=0V=AGND \text{ and } Vcc5V(+/-0.3V)=AVcc.$$

Where the maximum voltage for a PSU 10' that can be measured on the 3.3V rail is, say 5V, the bit resolution or scaling factor is 19.5 mV. The 5V and 12V rails, on the other hand, need to be scaled down to a range between AGND (Gnd) and AVCC (Vcc+/−0.3V) in order to measure their voltage levels.

The ADC is preferably capable of measuring up to 6.5V maximum on the 5V line, so the bit resolution is 24.5 mV. The ADC is further preferably capable of measuring up to 15V maximum on the 12V line, so the bit resolution is 58.6 mV.

E.g. On 5V rail actual voltage=4.85V
ADC reading=110001010b=C5 hex
PSU Voltage measurement=(ADC reading)*(bit resolution)=C5 hex*(0.0245)=4.8265V The PSU controller also monitors the current on the 3.3V, 5V and 12V power rails in the PSU. The current is calculated using the scaling values according to the PSU manufacturer for translating a measured voltage level to a current value. The 3.3V, 5V and 12V rails are divided down to a range between AGND and AVCC so they can be measured by the ADC.

Where the maximum current capable of being measured on the 3.3V line, is say 0.3A, the bit resolution is 1.17 mA. Where the maximum current capable of measured on the 5V line is, say 35A, the bit resolution is 136.7 mA. Where the maximum current capable of measured on the 12V line is, say 50A, the bit resolution is 195 mA.

E.g. On 5V rail actual current=27A
ADC reading=110001010b=C5 hex
PSU Current measurement=(ADC reading)*(bit resolution)=C5 hex*(0.1367)=26.9299A The PSU controller board of the preferred embodiment includes 34 bytes of permanent data storage. The information that these bytes contain includes: the serial number, part number, and the scaling factors for voltage and current conversion (according to the PSU manufacturer).

This information is stored in flash code space within the PSU controller at a fixed address. Alternatively, where PSU controller code has settled down, a microcontroller mask part can be introduced to reduce design cost. This mask part, however, does not allow changes to permanent data in manufacturing, and so to allow for this, an EEPROM 28 is included in the design. (This component is not stuffed in the manufactured product with the flash microcontroller.) Where the data specific to the PSU and setup during manufacturing is stored in the EEPROM, it can be loaded using programmable logic tools from for example Integrated Circuit Technology Corp. or another two wire serial master. (This would also require the addition of new commands, to allow the scaling factors, part number, and serial number to be programmed over the serial bus connecting the SES Processor to the PSU controller.)

Programming the PSU controller comprises:

1. Once only, compiling the PSU controller code including the firmware revision and the predefined scaling values for the voltage and current calculations generating a hex or binary file for download.
2. For every PSU, generating in production: the PSU serial number, part number and version number.

3. For every PSU, running a program to integrate the PSU serial number, part number and version number in to the hex or binary file for download.
4. For every PSU, running a download utility to program the PSU microcontroller.

As indicated above, communication between the SES Processor and the PSU controller is carried out using a serial bus. The present embodiment is described in terms of an I²C bus, where the PSU controller supports a serial slave mode only. Alternative busses include: RS-232, Serial Peripheral Interface (SPI) or an Enclosure Services Interface (ESI) bus.

When reading data from the PSU controller, the PSU controller is addressed as defined by the I²C bus at the correct serial address—valid addresses being from 20 hex to 23 hex. The serial read/write bit in the address byte which is set to read is then transmitted by SES Processor. The PSU controller device then acknowledges the receipt of its address, launches an internal interrupt service routine to process the read request and stretches the clock until it has processed the interrupt involving setting up the data to transmit.

The SES controller then toggles the serial bus clock 9 times (8 bits of data and 1 acknowledge) for each byte it wants to receive from the PSU controller. The PSU controller data is transmitted starting with byte 0 followed by byte 1 and continues until the SES Processor stops the transfer. If the number of bytes being clocked out exceeds the page length the byte OXBC hex will be transmitted.

The PSU controller is capable of receiving one or more bytes of data and transmitting 1 to 56 bytes of data, and the possible 56 bytes of data are shown in Table 1. This data is preferably held within the PSU controller in SRAM 30 or general purpose working registers (not shown). The first two bytes is read/write data, and the others are read only. When reading from the PSU controller, all 56 bytes can be read in the order shown. If more data bytes are written by the SES Processor than the single byte supported, then only the first byte is treated as valid the extra bytes received are ignored. If more than the maximum number of bytes available are requested by the SES Processor, the PSU microcontroller outputs FF hex after the last valid data byte.

Turning now to the details of the information in Table 1, PSU Summary, which is stored in a register, contains summary information on the current status of the PSU. Using these two bytes, it is possible to confirm correct operation of the PSU by a single read of this register. The two bytes are divided into the following bits as shown in Table 3.

TABLE 3

| Bit 7 | Bit 6 | Bit 5 | Bit 4 | Bit 3 | Bit 2 | Bit 1 | Bit 0 |
| --- | --- | --- | --- | --- | --- | --- | --- |
| Led Status and Request | | | Auto | AC Fail Latched | AC Fail | PSU Shutdown | Summary |
| Rsvd | Rsvd | Rsvd | Rsvd | Serial Comms Timeout | Power Up Ack | Temp Fail Latched | Temp Fail |

Summary is Set to a 1 when a fault is detected in the PSU, and is set to a 0 if the power supply is operating normally. Writing to this bit has no effect.

PSU Shutdown is set to a 1 when the power supply is forced off or non-operational due to an internal problem, 0 otherwise. Writing to this bit has no effect. The power supply hardware reports this state to the PSU controller via the AC Fail/Shutdown signal. When the shutdown signal causes an interrupt, the PSU ceases to operate and requires a power reset to recover. The PSU controller records all the digital inputs when this situation occurs and the PSU controller stops recording new values on the ADC channels. When accessed, the PSU controller only reports these latched values. After power on/off cycling of the PSU controller, the PSU controller returns to normal operation.

AC Fail is set to a 1 when the AC input voltage is below approximately 75 VAC, 0 otherwise. Writing to this bit has no effect.

AC Fail Latched records any AC fail until the SES Processor has seen it and requests that it be cleared. It is set to 1 if an AC_FAIL has been detected and recovered, and is recorded using an edge triggered interrupt. In the preferred embodiment, this bit can only be reset by the SES Processor, by writing a '1' to clear this bit.

Auto is set to a 0 when the PSU controller is working in autonomous mode, otherwise set to 1 by the SES Processor. The PSU controller, by default, has this bit cleared, as this allows it to report the PSU status to an operator via the LED. If the SES Processor sets this bit, the PSU controller does not report the PSU status via the LED—rather the status is under the control of the SES Processor. Once the PSU is under control of the SES Processor, the only way to reset it to autonomous mode is to reset the PSU controller or write the Auto bit back to 0.

In relation to Led Status and Request, the LED flashes on and off at different rate depending on the pattern set in these 3 bits. The flash rates are defined in Table 4 below.

TABLE 4

| Priority | LED Pattern | Description |
| --- | --- | --- |
| 0x00 | 0x0000 | LED permanently off |
| 0x01 | 0xaaaa | LED on for 125 mS LED off for 125 mS - repeat forever |
| ... | | |
| 0x06 | 0x0f0f | LED on for 500 mS LED off for 500 mS - repeat forever |
| 0x07 | 0xffff | LED permanently on |

Temp Fail is set to 1 if the power supply is in an over temperature condition, 0 otherwise.

Temp Fail Latched records any Temp fail until the SES Processor has seen it and requests that it be cleared. It is set to 1 if a Temp fail has been detected and gone away, and is recorded using an edge triggered interrupt. Preferably, this bit can only be reset by the SES Processor, by writing a 1 to clear this bit.

Power Up Ack is set to '1' every time the PSU controller is powered up. Writing a '1' to this location clears this bit.

Serial Comms Timeout is set when the PSU controller board detects a timeout on the serial bus. This normally occurs if the Master device (the SES Processor) does not supply a clock signal within 100 mS. A 1 must be written to this bit to set it back to 0.

PSU Status, is again stored in a register and contains information on the current status of the PSU. This is read from 6 "Dig I/O" inputs supplied by the PSU. (All the calculations for determining that a voltage and current is outside predetermined limits are carried out by the PSU hardware.) These signals show a failure when the power supply has gone outside the predefined parameters. The bits in this register are defined as shown in Table 5 below—all those marked reserved return zero when read. The remainder are each Set to 1 if the corresponding output voltage/current is outside predetermined limits, 0 otherwise. All writes to this register are ignored.

TABLE 5

| Bit 7 | Bit 6 | Bit 5 | Bit 4 | Bit 3 | Bit 2 | Bit 1 | Bit 0 |
|---|---|---|---|---|---|---|---|
| Rsvd | Rsvd | 12A Fail | 12v Fail | 5A Fail | 5v Fail | 3.3A Fail | 3.3v Fail |

3.3V, 5V, 12V Voltage Reading—when the corresponding register is read, it returns a hex value corresponding to the analog voltage measured on the 3.3V, 5V or 12V output. The voltage range is from 00 to FF hex where FF hex will be full scale of the ADC, i.e. the maximum measurable voltage. The analog voltage range of the ADC is from 0 to 5, 0 to 6.5 and 0 to 15 volts respectively and the resolution is in steps of 19.5 mV/bit, 25.4 mV/bit and 58.6 mV/bit. Writes to these registers are ignored.

The SES Processor in turn uses the following method to calculate the voltage read by the PSU controller.
(Voltage measurement)*(Resolution)
For example if 7C hex is read in from the PSU in the PSU controller 3.3V Register $$7C \text{ hex} = 124 \text{ decimal} =>(124)*(0.0195)=2.418V.$$

3.3V, 5V, 12V Current Reading—these registers return a value corresponding to the analog current sourced from the corresponding voltage rail output. The analog current ranges are from 0A to 0.3A, 0A to 35A and 0A to 50A respectively and the resolution of the ADC is in steps of 1.17 mA/bit, 136.7 Ma/bit and 195 mA/bit. Writes to these registers are ignored. These voltages are scaled using PSU manufacturer scaling factors in order to calculate the associated current. The current range is from 00 to FF hex where FF hex is full scale of the ADC, i.e. the maximum measurable current.

The SES Processor uses the following method to calculate the current read by the PSU controller.
(Current measurement)*(Resolution)
For example if 7C hex is read in from the PSU in the PSU controller 3.3A Register $$7C \text{ hex} = 124 \text{ decimal} =>(124)*(0.00117)=0.14508A.$$

3.3V, 5V, 12V Resolution—these values are used by the SES Processor to calculate the actual voltage measured on the respective voltage lines by the PSU controller. These values are fixed in the firmware and built in to the code at compile time as explained above. In the present example, theses value are as shown below:

| VOLTAGE SCALING FACTORS | | |
|---|---|---|
| Power Rail | Resolution | Register Value |
| 3.3 Volt | 19.5 mV/bit | 279Eh |
| 5 Volt | 25.4 mV/bit | 29ECh |
| 12 Volt | 58.6 mV/bit | 124Ah |

Data written to these locations is ignored. The resolution is stored in two bytes using a dedicated 2 byte floating point method defined below.

3.3V, 5V, 12V Current Resolution—these values are used by the SES Processor to calculate the actual current measured on the respective voltage lines by the PSU controller. These values are fixed in the firmware and built in to the code at compile time as explained above. In the present example, these values are as shown below:

| CURRENT SCALING FACTORS | | |
|---|---|---|
| Power Rail | Resolution | Register Value |
| 3.3 V Current | 1.17 mA/bit | 3492h |
| 5 V Current | 136.7 mA/bit | 1557h |
| 12 V Current | 195 mA/bit | 179Eh |

Data written to these locations is ignored and the resolution is stored in two bytes in the 2 byte floating point method mentioned above. In this regard, the NEC microcontroller (as with some other controllers) normally represents floating point values with a 4 byte number in standard IEEE format. This format is very long for the present application as there is a requirement to store the 6 floating point resolution values. It should also be noted that the PSU controller does not have to carry out any mathematical operations on these numbers, so the structure need not be in a standard format. For these reasons, in the preferred embodiment, a 2-byte format is used.

The basis to this floating point notation is that the scaling factors for the power supply can range from millivolts and milliamps to Volts and Amps. The Mantissa is defined as the scaling factor in thousands of millivolts or milliamps. The Exponent is the number of decimal point shifts required to evaluate the correct scaling factor.

The 16 bits are divided into two bit sections, 12 bits and 4 bits. The first 12 bits represent the Mantissa, a decimal millivolt number in hex format; while the 4 bits represent the exponent value ($*10^{-value}$). This is shown in a diagram below and a few examples are shown. The range of this notation is from $4.095*10^{-12}$ mV=(FFFF hex) to 4096 mV=4.096V (0FFF hex). This notation requires that the first byte of the Mantissa always has a hex value in it. If the converted decimal value exceeds 3 hex digits then the decimal value must be reduced by a factor of 10, i.e. 58.6 mV=$5860*10^{-2}$ mV=$586*10^{-1}$. This gives a scaling factor of 124A hex.

| 15 | 11 |
|---|---|
| 12 | 0 |
| Exponent | Mantissa | e.g.

19.5 mV=(decimal) $1950*10^{-2}$ mV=$79E*10^{-2}$ mV=279E hex 1.17 mA=(decimal) $1170*10^{-3}$ mV=$492*10^{-3}$ mV=3492 hex It will be seen that by building the scaling factors into the PSU controller firmware, upper level software may then be independent of the PSU used as this simply needs to retrieve a measured value and corresponding scaling factor to determine the voltage being supplied by the PSU.

PSU Part Number—this data is permanent and programmed in production as explained above. When these registers are read, they return the PSU part number as a string of up to 16 hexadecimal characters. The part number is made up of the firmware revision (FM), the hardware revision (HM), the system type and the hardware vendor as shown in table 6. (Each byte of HM and FM are valid from 00 to 99 ASCII) Preferably, the string matches the part number printed on the PSU label. Data written to this register is ignored.

TABLE 6

| Byte | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | Reserved | | | | | | Hardware Vendor | System | HM | | HM | | FM | | FM | |

PSU Serial Number—this data is permanent and programmed in production as explained above. When these registers are read they return the PSU serial number as a string of up to 16 ASCII characters. The serial number string should match the serial number printed on the PSU label and is the responsibility of operations. Data written to this register is ignored.

Build Number is a two byte hexadecimal value that starts at 0x0001 and is incremented every time a new release of the PSU controller firmware issued. This number is not a revision number but using this number and a firmware source code database one can build any revision of the PSU controller firmware.

On the other hand, when writing to the PSU controller, the first byte is a command byte and the subsequent bytes are data that are to be operated upon. In the preferred embodiment, data that is written to the PSU controller should be limited to 17 bytes, the first byte will be a command byte and the next 16 will be the data or payload. The commands that the PSU controller supports are listed in Table 7 with a data length and description.

Status Command is followed by 2 bytes of information, with all other bytes being ignored. The information in these bytes is as shown in Table 8 and valid as described in relation to PSU Summary above.

Error Priority—the PSU controller supports 11 possible errors, each of these is assigned a priority. The possible priorities are from 0 to 7 with 0 being the lowest. By default all errors are assigned a priority of 7. This priority is used to select a LED pattern to be displayed when the error occurs. If 2 errors are detected in the system the error with the highest priority will be used to select the led pattern to displayed. The table below shows the possible errors and the order that the data should be presented to the PSU controller.

| Failure | Default Priority |
|---|---|
| AC fail | 0x07 |
| Temp fail | 0x07 |
| 3.3 V fail | 0x07 |
| 5 V fail | 0x07 |
| 12 V fail | 0x07 |

-continued

| Failure | Default Priority |
|---|---|
| 3.3I fail | 0x07 |
| 5I fail | 0x07 |
| 12I fail | 0x07 |
| PSU Shutdown | 0x07 |
| AC fail latch | 0x07 |
| Temp fail latch | 0x07 |

Led Pattern—as explained above, the PSU controller supports 8 possible LED Patterns, and these are directly related to the priority of an error. So using Table 4 above 0x00 hex=0x0000 hex will force the LED to be off all the time and 0x07 hex=0xffff hex will force the LED to be on all the time.

Scaling Factor—as explained above, the PSU controller supports 6 analog readings, each of which have an associated scaling factor or resolution. The ADC on the PSU controller only measures from 0 to 5 volts so the analog signals must be scaled to represent the true value in the power supply. These values are fixed based on the engineering specification for each PSU 10. The values also take the floating point format described below. The order that the PSU controller expects to receive this data is shown below.

Resolution for 3.3 V
Resolution for 5 V
Resolution for 12 V
Resolution for 3.3 V Current
Resolution for 5 V Current
Resolution for 12 V Current Part Number—the part number for the PSU controller is 16 bytes long and the format used is defined above.

Serial Number—the serial number for the PSU controller is also 16 bytes long and the format used is defined above.

Reboot causes the PSU controller to restart from the beginning of its code. This reboot appears to the user and to the SES Processor as a power-on reset of the PSU controller. The PSU power up bit is set after this command is executed, any data in RAM will be lost after this command is executed.

TABLE 1

| Byte | Direction | Name | Description |
|---|---|---|---|
| Byte 0 | R/W | PSU Summary 0 | Power Supply Summary 0 |
| Byte 1 | R/W | PSU Summary 1 | Power Supply Summary 1 |
| Byte 2 | R | PSU Status 0 | Power Supply Status 0 |
| Byte 3 | R | Reserved | Reserved |
| Byte 4 | R | 3.3 V Voltage Reading | Actual voltage on the 3.3 V line |
| Byte 5 | R | 5 V Voltage Reading | Actual voltage on the 5 V line |
| Byte 6 | R | 12 V Voltage Reading | Actual voltage on the 12 V line |

TABLE 1-continued

| Byte | Direction | Name | Description |
|---|---|---|---|
| Byte 7 | R | 3.3 V Current Reading | Actual current on the 3.3 V line |
| Byte 8 | R | 5 V Current Reading | Actual current on the 5 V line |
| Byte 9 | R | 12 V Current Reading | Actual current on the 12 V line |
| Byte 10, 11** | R | 3.3 V Resolution | 3.3 V Resolution (19.5 mV) |
| Byte 12, 13** | R | 5 V Resolution | 5 V Resolution (24.5 mV) |
| Byte 14, 15** | R | 12 V Resolution | 12 V Resolution (58.6 mV) |
| Byte 16, 17** | R | 3.3 A Resolution | 3.3 V current Resolution (1.17 mA) |
| Byte 18, 19** | R | 5 A Resolution | 5 V current Resolution (136.7 mA) |
| Byte 20, 21** | R | 12 A Resolution | 12 V current Resolution (195 mA) |
| Byte 22** ... Byte 37 | R | PSU Part Number | PSU part number also on label of PSU |
| Byte 38* ... Byte 53 | R | PSU Serial Number | PSU serial number also on bar code label |
| Byte 54 Byte 55 | R | Build Number | A number directly related to the revision of the firmware |

*Permanent data stored in Flash from manufacturing
**Permanent data from Firmware build

TABLE 2

| Name | Type | Purpose |
|---|---|---|
| SMB_A0, SMB_A1 | 2 digital inputs | These are used to configure the 2 wire serial address for the microcontroller |
| Yellow LED | 1 digital LED output | Used to control the Fault LED |
| 3.3 V, 5 V, 12 V Monitor IC 3.3 V, 5 V, 12 Imonitor IC | 6 anolog to digital converter (ADC) inputs | These are used to measure the current and the voltages on the 3.3, 5 and 12 volt lines |
| AC FAIL/AC SHUTDOWN | 1 digital interupt pin | Used to detect AC fail conditions |
| SMB_SCL, SMB_SDA | 2 dedicated digital I/O lines with serial hardware | Used for the 2 wire I²C serial bus interface |
| Temp Fail | 1 digital input/interrupt | Used to detect a PSU temperature failure |
| 3.3 V, 5 V, 12 V Fail 3.3 V, 5 V, 12, IFail | 6 digital inputs | Used to detect current and voltage failure on the 3.3, 5, and 12 v lines |
| Vref | 1 anolog reference voltage | Used to determine the voltage and currents measured on the ADC |
| SCL_MSK, SDA_MSK | 2 digital I/O lines | Used to talk to an EEPROM if a Mask part is used. The EEPROM stores the Part No. Serial No. and the PSU revision. |

TABLE 7

| Command | Command Byte | Data Length | Data Description |
|---|---|---|---|
| Status | 0x01 | 2 bytes | Status Data to be implemented by the PSU controller |
| Error Priority | 0x02 | 11 bytes | The error led information for each error in the PSU controller Note 1 |
| Led Pattern | 0x03 | 8 integers (16 bytes) | The pattern that each led priority is allocated Note 1 |
| Scaling Factor | 0x04 | 8 integers (16 bytes) | The scaling factor associated with each analog measurement. Note 1 |
| Part Number | 0x05 | 16 bytes | The PSU controller board part number Note 1 |
| Serial Number | 0x06 | 16 bytes | The PSU controller board serial Number Note 1 |
| Reboot | 0xbb | 0 bytes | This will cause the PSU controller to restart |

Note 1 - Without an EEPROM, changes to this information are received and stored in RAM, so everytime the PSU controller is reset this information has to be updated.
With an EEPROM, this information is written out to the EEPROM and stored permanently.

TABLE 8

| Bit 7 | Bit 6 | Bit 5 | Bit 4 | Bit 3 | Bit 2 | Bit 1 | Bit 0 |
|---|---|---|---|---|---|---|---|
| Led Status and Request | | | Enable Auto Mode | Reset AC Fail Latched | Rsvd | Rsvd | Rsvd |
| Rsvd | Rsvd | Rsvd | Rsvd | Rsvd | Power Up Ack | Temp Fail Latched | Rsvd |

What is claimed is:

1. A power supply unit controller for a rack enclosure in which a plurality of devices communicate via a backplane, said controller comprising:

means for reading at least one signal indicative of an output supply level being provided to said backplane by a power supply unit associated with said power supply unit controller;

memory for storing at least one value associated with a respective one of the at least one signal;

means for communicating said at least one value to one of said devices; and means for receiving power for said power supply unit controller from said backplane;

further characterized in that one of said devices is an Enclosure Services processor arranged to communicate with a bus controller through one of a SCSI Enclosure Services (SES) or a SCSI Access Fault Tolerant Enclosure (SAF-TE) protocol and said power supply unit controller is adapted to communicate with said Enclosure Services processor.

2. A rack enclosure including a backplane, at least one power supply unit connected to and adapted to supply power to said backplane, each associated with a respective power supply unit controller according to claim 1, and a plurality of devices receiving power from said backplane, at least one of said devices adapted to communicate with the at least one power supply unit controller;

further characterized in that one of said devices is an Enclosure Services processor arranged to communicate with a bus controller through one of a SCSI Enclosure Services (SES) or a SCSI Access Fault Tolerant Enclosure (SAF-TE) protocol and said power supply unit controller is adapted to communicate with said Enclosure Services processor.

3. A power supply unit controller for a rack enclosure in which a plurality of devices communicate via a backplane, said controller comprising:

means for reading at least one signal indicative of an output supply level being provided to said backplane by a power supply unit associated with said power supply unit controller; memory for storing at least one value associated with a respective one of the at least one signal;

means for communicating said at least one stored value to one of said devices; and means for receiving power for said power supply unit controller from said backplane;

further characterized in that one of said devices is an Enclosure Services processor arranged to communicate with a bus controller through one of a SCSI Enclosure Services (SES) or a SCSI Access Fault Tolerant Enclosure (SAF-TE) protocol and said power supply unit controller is adapted to communicate with said Enclosure Services processor.

* * * * *